United States Patent [19]

Bockelmann et al.

[11] 4,168,240

[45] Sep. 18, 1979

[54] PROCESS FOR THE PREPARATION OF A CHROME TANNING AGENT AND GLAUBER'S SALT

[75] Inventors: Wolfgang Bockelmann; Georg Uecker, both of Leverkusen; Hans Niederprüm, Monheim, all of Fed. Rep. of Germany

[73] Assignee: Bayer Aktiengesellschaft, Leverkusen, Fed. Rep. of Germany

[21] Appl. No.: 878,544

[22] Filed: Feb. 16, 1978

[30] Foreign Application Priority Data

Mar. 9, 1977 [DE] Fed. Rep. of Germany ....... 2710175

[51] Int. Cl.[2] .......................... C14C 3/06; C14C 9/00; C01D 15/06; C01G 37/02

[52] U.S. Cl. .................................... 252/8.57; 8/94.27; 423/55; 423/198; 423/551; 423/607

[58] Field of Search .................. 423/55, 57, 551, 596, 423/597, 607, 198; 8/94.27; 252/8.57

[56] References Cited

U.S. PATENT DOCUMENTS

| | | | |
|---|---|---|---|
| 409,336 | 8/1889 | Rappe | 423/55 |
| 1,983,733 | 12/1934 | Binns | 423/607 |
| 2,110,187 | 3/1938 | Williams | 423/57 |
| 2,766,098 | 10/1956 | Perrin | 8/94.27 |
| 3,097,064 | 7/1963 | Caldwell | 423/607 |
| 3,822,993 | 7/1974 | Rubinson et al. | 8/94.27 |
| 3,950,131 | 4/1976 | Young | 8/94.27 |

OTHER PUBLICATIONS

E. Giusiana Utilization of Residues from Chome Tannage Le Cuir, 15 Dec. 1912, pp. 799-803, as abstracted by J. American Leather Chemical Association, vol. 8, 1913, p. 68.

Skoog et al., Fundamentals of Analytical Chemistry, Holt Rinehart and Winston, NY, NY, 1963, pp. 188-191, 745-746.

*Primary Examiner*—O. R. Vertiz

*Assistant Examiner*—Gary P. Straub

*Attorney, Agent, or Firm*—Sprung, Felfe, Horn, Lynch & Kramer

[57] ABSTRACT

A process for the preparation of a chrome-tanning agent and Glauber's salt from sodium bisulphate contaminated with chromium compounds obtained as by-product from the manufacture of chromic acid from solid sodium dichromate and sulphuric acid, comprising (a) treating an about 20 to 70% aqueous sodium bisulphate solution which contains chromium compounds and is acid with sulphuric acid with sulphur dioxide until all the chromium is present in the form of chromium (III);

(b) adding sodium hydroxide to the reduced solution until it has a pH of between about 4 and 5;

(c) adding sodium carbonate to the solution to a pH of between approximately 8 and 8.5, thereby precipitating chromium (III) hydroxide;

(d) separating off the precipitated chromium (III) hydroxide; and (e) evaporating the filtrate left after removal of the chromium (III) hydroxide to yield solid sodium sulphate.

Advantageously, the reduced solution obtained in (a) is divided into a major portion and a minor portion, the major portion being employed in (b), the minor portion being combined with the chromium (III) hydroxide separated off in (d) to produce a chromium sulphate/-sodium sulphate solution which is evaporated to dryness. Desirably, the minor portion is such an amount relative to the chromium content of the starting material that the chromium sulphate/sodium sulphate solution has a basicity accordng to Schorlemmer of about 33%, and the molar amount of water in the solution after precipitation of the chromium (III) hydroxide is about 10 times that of the sodium sulphate, the solution thereafter being cooled to form solid $Na_2SO_4.10H_2O$.

6 Claims, No Drawings

PROCESS FOR THE PREPARATION OF A CHROME TANNING AGENT AND GLAUBER'S SALT

This invention relates to a process for the preparation of a chrome tanning agent and Glauber's salt from the sodium bisulphate which is obtained as a by-product contaminated with chromium compounds in the preparation of chromic acid from solid sodium dichromate and sulphuric acid.

Sodium bisulphate contaminated with chromium compounds is obtained in considerable quantities as a by-product in the preparation of chromic acid from sodium dichromate. This sodium bisulphate cannot readily be utilized or stored because of the chromium compounds which it contains.

One possible method of rendering this sodium bisulphate suitable for storage consists of neutralizing the acid sulphate with burnt lime after a suitable reduction treatment. The chromium hydroxide which is simultaneously formed becomes incorporated in the resulting calcium sulphate. The disadvantage of this process is that it neither enables recovery of the chromium nor diminishes the quantity of waste material which has to be stored.

The alternative method of oxidizing the chromium(III) present to chromium(VI) and using the resulting solution for the preparation of sodium dichromate is also highly uneconomical. The chromium(III), which may be present in only small concentrations, could be oxidized by an electrolytic process to chromium(VI) but such electrolytic processes are expensive. Furthermore, chemical oxidation, for example with hydrogen peroxide, is either unquantitative when carried out in the strongly acid solution or, when some other oxidizing agent such as potassium chlorate is used, it may be impracticable due to the introduction of foreign ions.

The present invention provides a process for the preparation of a chrome tanning agent and Glauber's salt from sodium bisulphate obtained as by-product contaminated with chromium compounds from the preparation of chromic acid by reaction of solid sodium dichromate with sulphuric acid, which process is characterized in that:

(a) an about 20 to 70% aqueous solution or suspension of sodium bisulphate which is acid due to the presence of sulphuric acid and still contains chromium compounds is treated with sulphur dioxide until the total chromium content is present in the form of chromium(III);

(b) sodium hydroxide is added to a part of this reduced solution until it has a pH of between about 4 and 5;

(c) the solution is then adjusted to a pH of between about 8 and 8.5 by the addition of sodium carbonate;

(d) the precipitated chromium(III) hydroxide is separated off and, if necessary, washed with water;

(e) the chromium(III) hydroxide separated off at d) is reacted with the remainder of the reduced solution obtained at a) so that a basic chromium(III) sulphate solution containing sodium sulphate is obtained, which solution has a basicity according to Schorlemmer of about 20 to 50%, preferably about 33 %; and (f) the filtrate left after removal of the chromium(III) hydroxide is evaporated to isolate solid sodium sulphate.

The process according to the invention enables both the chromium and the sodium salt contents of the contaminated sodium bisulphate obtained as by-product of chromium acid manufacture to be utilized. For this purpose, the sodium bisulphate dissolved in a little water to form a 20 to 70% by weight solution or slurry is treated with gaseous $SO_2$ until the total chromium content of the solution is present in the form of chromium(III), and after neutralization of the bisulphate, the chromium is then precipitated as hydroxide and separated off. Pure sodium sulphate preferably in the form of Glauber's salt, which is $Na_2SO_4.10H_2O$, is obtained as by-product by evaporation of the filtrate resulting after the precipitation of the chromium hydroxide. The purity of the sodium sulphate obtained depends mainly on the conditions under which the precipitation and filtration are carried out.

One step of the process which is relatively difficult to carry out on a large industrial scale is the precipitation of chromium(III) hydroxide. Precipitation with sodium hydroxide solution is very difficult to control when carried out on a large scale and requires accurate analytical monitoring because an occasional local excess of sodium hydroxide solution gives rise to soluble chromium hydroxo complexes. Moreover, precipitation with sodium hydroxide solution results in the formation of very bulky, jelly-like chromium hydroxide precipitates which are difficult to filter and adsorb large quantities of foreign ions. Precipitates which are much easier to filter are obtained by using calcium oxide, magnesium oxide or sodium carbonate, but even these precipitating agents have various disadvantages. When calcium oxide is used as neutralizing agent, it gives rise to sparingly soluble calcium sulphate, whereas when magnesium oxide is used, the sodium sulphate present in the filtrate can no longer be isolated in the presence of the magnesium sulphate which is simultaneously formed. If, on the other hand, sodium carbonate alone is used as neutralizing agent, although the chromium hydroxide then does not become contaminated with foreign ions, the formation of large quantities of carbon dioxide proves to be troublesome.

It has now been found that the difficulties described above can be overcome if neutralization of the sodium bisulphate is carried out using sodium hydroxide to a pH of about 4 or 5. At these pH values only small quantities of insoluble chromium compounds are formed. Thus, the precipitation of chromium hydroxide, now requiring only relatively small quantities of alkali owing to the low chromium(III) salt concentration, is then carried out by the addition of sodium carbonate until a pH of between about 8 and 8.5 is reached. The evolution of carbon dioxide is no longer a problem because it only occurs to a small extent.

It has surprisingly been found that the precipitate formed by the addition of sodium carbonate or sodium carbonate solution is the more easily filtered the more highly concentrated is the solution.

In a preferred variation of the process, precipitation is carried out in a solution of such concentration that the water content, based on the proportion of sodium sulphate formed, corresponds approximately to the formula $Na_2SO_4.10H_2O$ whereby on filtration, liquid sodium sulphate decahydrate, which solidifies at 32° C., can be obtained directly as filtrate. This compound can then be used in various ways, for example it has been suggested that it could be used as a medium for latent heat storers.

When the chromium hydroxide has been filtered off and, if necessary, freed from excess sodium sulphate by washing with water, it is reacted with a suitably calculated minor quantity of the sodium bisulphate solution which has been reduced with sulphur dioxide and contains a chromium(III) salt. The quantity is calculated according to the chromium content of the chromium hydroxide so that the reaction results in a solution which has a basicity according to Schorlemmer of from about 20 to 50%. In a solution which has a basicity of approximately 33%, the chromium sulphate/sodium sulphate ratio is approximately 1 : 1. The solution obtained in this way may either be used directly for tanning pelt or skins or it may be dried, e.g. by spray drying, to convert it into a pulverulent chrome tanning agent having a basicity of approximately 33%.

The proportion of reduced bisulphate solution which will be neutralized with sodium hydroxide is calculated from the total chromium content of this solution. A total chromium content calculated to correspond to approximately 2.8% of $Cr_2O_3$ in the crude sodium bisulphate product, for example, will result in a proportion of approximately 12/13:1/13 in the solutions which are to be worked up separately. This means that sodium hydroxide and subsequently sodium carbonate are added to approximately 12/13 of the total quantity of solution which is reduced with sulphur dioxide while the chromium hydroxide which is separated off is added to 1/13 of the solution.

The solution which is subsequently obtained and which may still need to be filtered is then worked up into a pulverulent or liquid chrome tanning agent in known manner while the chromium hydroxide filtrates are evaporated to yield sodium sulphate either in its anhydrous form or containing 10 molecules of water of crystallization. Any filtrates obtained from washing the precipitated chromium hydroxide may also be worked up to yield sodium sulphate after they have been evaporated, so that this process does not give rise either to any by-products or waste products.

The present process can be used for obtaining a chrome tanning agent and sodium sulphate not only from the sodium bisulphate obtained as by-product from chromic acid manufacture but also from chromate-containing sodium sulphate obtained from the acidification of the sodium monochromate liquor with sulphuric acid. The process described above is applied to this substance in the same way except that the neutralization with sodium hydroxide solution after reduction of the chromium compounds with sulphur dioxide is omitted and the quantity of sodium carbonate or sodium carbonate solution required to raise the pH to approximately 8-8.5 is directly added to the reduced sodium sulphate solution to precipitate the chromium hydroxide.

The process according to the invention will be explained in more detail in the following examples in which numerical data refer to parts or percentages by weight. The figures given for the sodium bisulphate content were calculated as average values obtained from a sample after determination of the residue after ignition, the sulphate content, and the titration of the free acid. The free sulphuric acid content, in particular, varied within certain limits (a few percent).

EXAMPLE 1

1000 Parts of sodium bisulphate (containing approximately 91% of $NaHSO_4$) having a total chromium oxide content of 2.8% (calculated as $Cr_2O_3$) were dissolved in 1000 parts of water and reduced with 51 parts of gaseous $SO_2$ at a temperature of 60° C. The dark green solution obtained was free from hexavalent chromium. 640 Parts of a mixture of 500 parts of water and 500 parts of solid sodium hydroxide were added dropwise to this solution. The reaction product had a pH of approximately 4. After the addition of 0.2 parts of a commercial organic filtering agent based on polyacrylamide, 180 parts of a mixture of 160 parts of anhydrous sodium carbonate and 740 parts of water were slowly added to the liquid with vigorous stirring. On completion of the reaction, the mixture was initially found to have a pH of approximately 8 but, within one hour, this fell to approximately 7.3 to 7.4.

The chromium hydroxide precipitate formed was suction filtered while hot and the residue was mixed with 2000 parts of water, heated and again filtered. The yield of chromium hydroxide (with a chromium oxide content of 7.65% $Cr_2O_3$) weighed while still moist was 350 parts, which corresponds to a $Cr_2O_3$ yield of 98.5%.

1020 Parts of anhydrous sodium sulphate were obtained from the evaporated filtrates. This corresponds to an $Na_2SO_4$ yield of approximately 95% of the theoretical yield.

EXAMPLE 2

1000 Parts of sodium bisulphate (containing approximately 91% of $NaHSO_4$) having a total chromium content of 2.8% $Cr_2O_3$ were dissolved in 1000 parts of water and reduced with 51 parts of gaseous $SO_2$ at a temperature of 60° C. The resulting deep green solution no longer contained any hexavalent chromium. 154 Parts of the reduced solution (=≠of the total quantity) were separated off. The remainder of the solution (=12/13 of the total quantity) was reacted dropwise with 600 parts of a mixture of 500 parts of solid NaOH and 500 parts of water within a period of one hour. After the addition of 0.05 parts of a commercial organic filtering agent, 264 parts of a mixture of 100 parts of anhydrous sodium carbonate and 500 parts of water were added dropwise over a period of one hour at a temperature of 60° C. The pH was approximately 8 after 2 hours. When the readily filterable chromium hydroxide precipitate which was still contaminated with sodium sulphate, has been filtered off, it was suspended in 1000 parts of water and the suspension was heated to 60° C. and again filtered. 136 Parts of chromium hydroxide precipitate (weighed moist) having a chromium oxide content of 20% $Cr_2O_3$, corresponding to a $Cr_2O_3$ yield of 97.5% were obtained. The evaporated filtrates were collected and found to amount to 995 parts of anhydrous sodium sulphate, corresponding to a yield of 92% of the theoretical yield.

The 131 parts of chromium hydroxide precipitate were reacted with the above mentioned 154 parts of reduced $NaHSO_4$ solution (=1/13 of the total quantity) and heated to 60°-70° C. until substantially completely dissolved. The solution had a basicity of 33% and a pH of approximately 2.5. It could either by used directly for chrome tanning or spray dried.

EXAMPLE 3

1000 Parts of sodium sulphate obtained by acidifying chromate liquor with sulphuric acid and containing 8.3% of water and 0.2% of $Cr_2O_3$ (total chromium oxide content) were dissolved in 1000 parts of water at 70° C. and adjusted to a pH of approximately 3 with 2 parts of concentrated sulphuric acid. Gaseous $SO_2$ was then introduced until all the hexavalent chromium had been reduced, which was achieved after barely 10 minutes due to the small quantity of chromium present. After the addition of 0.1 parts of a commercial organic filtering agent, 244 parts of a solution of 110 parts of anhydrous sodium carbonate and 500 parts of water were added dropwise with vigorous stirring. The resulting solution was found to have a pH of 8.5. After it has been left to stand for 2 hours, the chromium hydroxide which precipitated during this time was filtered off hot and the filter residue was suspended in 500 parts of water and again filtered. 43 Parts of chromium hydroxide (weighed moist) having a chromium oxide content of 4.45% $Cr_2O_3$ were obtained, which corresponds to a chromium oxide yield of 95% of the theoretical yield.

The combined filtrates were adjusted to a pH of approximately 4 with 13 parts of concentrated sulphuric acid and the solution was boiled to remove dissolved carbon dioxide and sulphurous acid. After concentrations of this solution by evaporation, 940 parts of anhydrous sodium sulphate were obtained, which corresponds to an $Na_2SO_4$ yield of 96.3%. The chromium hydroxide was then worked up as described in Example 2.

EXAMPLE 4

1000 Parts of sodium bisulphate (containing 91% of $NaHSO_4$) having a total chromium content of 3.35% $Cr_2O_3$ were dissolved in 1000 parts of water and reduced with 40 parts of gaseous $SO_2$ at a temperature of 60° C. The resulting deep green solution no longer contained any hexavalent chromium. 640 parts of a mixture of 500 parts of water and 500 parts of solid sodium hydroxide were added dropwise to this solution. The reaction product had a pH of approximately 12. The chromium hydroxide separated as a bulky precipitate which was difficult to filter. 200 Parts of solid $CO_2$ (dry ice) were added to 500 parts of the suspension in a 2 liter autoclave and the suspension was kept for 2 hours at a temperature of 170° C. and a pressure of 50 bar.

After cooling and release of pressure, a virtually neutral (pH 6-7) chromium hydroxide suspension which could easily be filtered was obtained. The chromium hydroxide filter cake obtained after filtration was washed with 1000 parts of water and again filtered. The yield of chromium hydroxide weighed moist (with a chromium oxide content of 28% $Cr_2O_3$) amounted to 59 parts, which corresponds to a $Cr_2O_3$ yield of 98.6% of the theoretical yield.

The combined filtrates were heated to boiling, adjusted to pH 5 with 9 parts of concentrated sulphuric acid and concentrated by evaporation. 537 Parts of anhydrous sodium sulphate were obtained, corresponding to an $Na_2SO_4$ yield of 96% of the theoretical yield.

It will be appreciated that the instant specification and examples are set forth by way of illustration and not limitation, and that various modifications and changes may be made without departing from the spirit and scope of the present invention.

What is claimed is:

1. A process for the preparation of a chromium-containing material and Glauber's salt from sodium bisulphate contaminated with chromium compounds obtained as by-product from the manufacture of chromic acid from solid sodium dichromate and sulphuric acid, comprising (a) treating an about 20 to 70% aqueous sodium bisulphate solution which contains chromium compounds and is acid with sulphuric acid with sulphur dioxide until all the chromium is present in the form of chromium (III);

(b) adding sodium hydroxide to the reduced solution until it has a pH of between about 4 and 5;

(c) adding sodium carbonate to the solution to a pH of between approximately 8 and 8.5, thereby precipitated chromium (III) hydroxide;

(d) separating off the precipitated chromium (III) hydroxide; and (e) evaporating the filtrate left after removal of the chromium (III) hydroxide to yield solid sodium sulphate.

2. A process according to claim 1, wherein the molar amount of water in the solution after precipitation of the chromium (III) hydroxide is brought to about 10 times that of the sodium sulphate, the solution thereafter being processed to recover solid $Na_2SO_4.10\ H_2O$.

3. A process according to claim 1, wherein the reduced solution obtained in (a) is divided into a major portion and a minor portion, the major portion being employed in (b), the minor portion being combined with the chromium (III) hydroxide separated off in (d) to produce a chromium sulphate/sodium sulphate solution.

4. A process according to claim 3, wherein the minor portion is such an amount relative to the chromium content of the starting material that the chromium sulphate/sodium sulphate solution has a basicity according to Schorlemmer of about 20 to 50%.

5. A process according to claim 3, wherein the chromium sulphate/sodium sulphate solution is evaporated to dryness.

6. A process according to claim 5, wherein the minor portion is such an amount relative to the chromium content of the starting material that the chromium sulphate/sodium sulphate solution has a basicity according to Schorlemmer of about 33%, and wherein the molar amount of water in the solution after precipitation of the chromium (III) hydroxide is brought to about 10 times that of the sodium sulphate, the solution thereafter being cooled to form solid $Na_2SO_4.10\ H_2O$.

* * * * *